(12) United States Patent
Urabe et al.

(10) Patent No.: US 6,265,081 B1
(45) Date of Patent: Jul. 24, 2001

(54) INTEGRALLY MOLDED ARTICLES OF POLYAMIDE RESINS

(75) Inventors: Hiroshi Urabe; Hajime Oyama; Tatsuya Hitomi, all of Hiratsuka (JP)

(73) Assignee: Mitsubishi Engineering Plastics Corporation, Tokyo (JP)

( * ) Notice: Subject to any disclaimer, the term of this patent is extended or adjusted under 35 U.S.C. 154(b) by 0 days.

(21) Appl. No.: 09/325,965

(22) Filed: Jun. 4, 1999

(30) Foreign Application Priority Data

Jun. 8, 1998 (JP) .................................................. 10-158724

(51) Int. Cl.[7] .............................. B32B 27/08; B32B 27/34
(52) U.S. Cl. ..................................... 428/474.4; 428/474.7; 428/474.9; 425/543
(58) Field of Search ............................. 428/474.7, 474.4, 428/474.9; 425/543

(56) References Cited

U.S. PATENT DOCUMENTS

| | | | | |
|---|---|---|---|---|
| 4,234,643 | * | 11/1980 | Grotefend | 428/200 |
| 4,377,629 | * | 3/1983 | Tammi | 430/62 |
| 4,895,612 | * | 1/1990 | Avvramova | 156/326 |
| 4,919,987 | * | 4/1990 | Menner | 428/60 |
| 4,980,237 | * | 12/1990 | Avramova | 428/474.7 |
| 5,028,644 | * | 7/1991 | Heinz | 524/90 |
| 5,637,408 | * | 6/1997 | Oenbrink | 428/474.7 |
| 5,932,686 | * | 8/1999 | Hott | 528/288 |
| 6,090,459 | * | 7/2000 | Jadamus | 428/36.4 |

FOREIGN PATENT DOCUMENTS

| | | |
|---|---|---|
| 57-115454 | 7/1982 | (JP) . |
| 4-307148 | 12/1992 | (JP) . |

* cited by examiner

*Primary Examiner*—Leszek Kiliman
(74) *Attorney, Agent, or Firm*—David G. Conlin; Peter F. Corless; Dike, Bronstein, Roberts & Cushman, IP Group

(57) ABSTRACT

The present invention relates to an integrally molded article of polyamide resin comprising at least one primary molded pieces made of a primary molding material and at least one secondary molded pieces made of a secondary molding material, and having a welded part, said secondary molding material being injection molded on the surface of said primary molded piece, thereby welding the secondary molded piece comprising the secondary molding material to said primary molded piece, and said primary and secondary molding materials each comprising 100 parts by weight of a polyamide resin and 0.05 to 10 parts by weight of nigrosine or a nigrosine derivative.

11 Claims, 1 Drawing Sheet

INTEGRALLY MOLDED ARTICLES OF POLYAMIDE RESINS

BACKGROUND OF THE INVENTION

The present invention relates to integrally molded articles of polyamide resins, particularly, it relates to integrally molded articles of polyamide resins integrated by injection welding.

Since polyamide resins are excellent in many properties such as mechanical properties, heat resistance, chemical resistance and wear resistance, they are used as a substitute material for metals such as iron, zinc and aluminum. Usually, various commercial articles are molded with polyamide resins by injection molding. However, in the case of certain types of molded articles, for example, hollow molded articles, it is impossible to mold the article with one normal mold.

Recently, there are many attempts to use polyamide resins for the hollow molded parts such as intake manifold of automobile engine, intake resonator, reservoir tank, etc. For producing such molded articles, there is used, for instance, a method in which two segments of a hollow molded article to be produced are first molded and these segments are welded by suitable means such as vibration welding. However, the shape of the segments that can be welded together by vibration welding or other means is restricted, and it is difficult by this method to obtain the resin molded articles of a complex configuration.

On the other hand, according to injection welding in which the segments formed by primary molding are set in a mold cavity and resin is injection molded along the butted edges of the segments to weld them together, the restriction on the shape of the segments is mild and the molded articles having a complex configuration can be obtained relatively easily. However, weld strength of the articles obtained by injection welding is generally low as compared with the articles produced by vibration welding, and in manufacture of the hollow tubes, such as intake manifold, which have the possibility to face elevation of internal pressure due to backfire of the engine or other causes, it is difficult to obtain the articles with high reliability.

As a result of the present inventors' earnest studies to solve the above problem, it has been found that the integrally molded articles of polyamide resins obtained by injection welding the moldings of a polyamide resin composition(s) prepared by blending glass fiber and nigrosine or a nigrosine derivative in the specified percentages in a polyamide resin have excellent weld strength.

The present invention has been attained on the basis of the above finding.

SUMMARY OF THE INVENTION

The object of the present invention is to provide integrally molded articles of polyamide resins which have many excellent properties such as high mechanical strength, heat resistance, chemical resistance, etc., as well as high weld strength.

To attain the above aim, in the first aspect of the present invention, there is provided an integrally molded article of polyamide resin comprising at least one primary molded pieces made of a primary molding material and at least one secondary molded pieces made of a secondary molding material, and having a welded part, said secondary molding material being injection molded on the surface of said primary molded piece, thereby welding the secondary molded piece comprising the secondary molding material to said primary molded piece, and said primary and secondary molding materials each comprising 100 parts by weight of a polyamide resin and 0.05 to 10 parts by weight of nigrosine or a nigrosine derivative.

In the second aspect of the present invention, there is provided an integrally molded article of polyamide resin comprising at least one primary molded pieces made of a primary molding material and at least one secondary molded pieces made of a secondary molding material, and having a welded part, said secondary molding material being injection molded on the surface of said primary molded piece, thereby welding the secondary molded piece comprising the secondary molding material to said primary molded piece, and the said primary and secondary molding materials each comprising 100 parts by weight of a polyamide resin, not more than 100 parts by weight of glass fiber and 0.05 to 10 parts by weight of nigrosine or a nigrosine derivative.

In the third aspect of the present invention, there is provided a process for producing the integrally molded article according to the first aspect, comprising:

producing at least one primary molded pieces by molding a primary molding material, having the primary molded pieces in the mold cavity for secondary molding, injection molding the polyamide resin composition as second molding material on the surface of the primary molded piece, and welding the primary molded piece and the molded piece portion comprising the secondary molding material.

In the fourth aspect of the present invention, there is provided a process for producing the integrally molded article according to the second aspect, comprising:

producing at least one primary molded pieces by molding a primary molding material, having the primary molded pieces in the mold cavity for secondary molding, injection molding the polyamide resin composition as second molding material on the surface of the primary molded piece, and welding the primary molded piece and the molded piece portion comprising the secondary molding material.

DETAILED DESCRIPTION OF THE INVENTION

Figure 1:
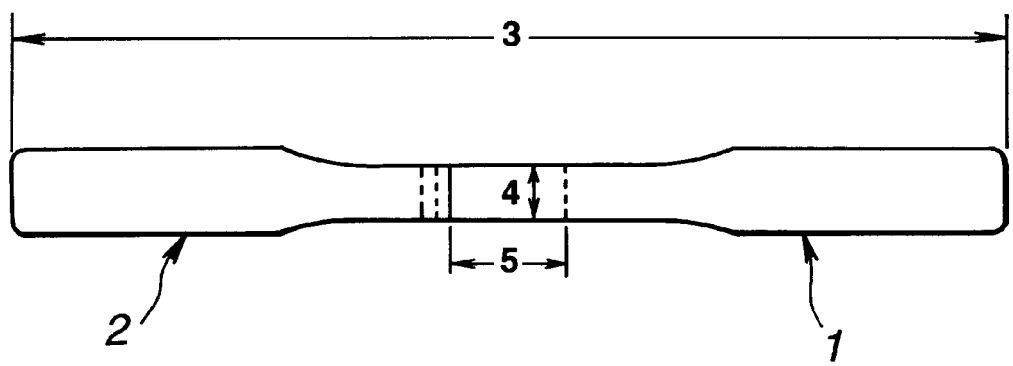
FIG. 1 is a plane view of an integrally molded article of polyamide resin (specimen B) for determining weld strength of the primary molded piece (specimen A) and the secondary molding material.

The present invention is described in detail below.

The integrally molded articles of polyamide resin according to the present invention can be obtained by injection molding a polyamide resin composition (secondary molding material) on the surface of a primary molded piece made of a polyamide resin composition (primary molding material) in a mold, and welding the primary molded piece and the portion of the secondary molded piece comprising the secondary molding material. There may be used either one or plural primary molded pieces. The primary molding material and the secondary molding material are the polyamide resin compositions both comprising 100 parts by weight of a polyamide resin, 0 to 100 parts by weight of glass fiber and 0.05 to 10 parts by weight of nigrosine or a nigrosine derivative. The polyamide resin composition used as the secondary molding material may be the same as or different from the polyamide resin composition used as the primary molding material. They are preferably the same.

The polyamide resins usable in the present invention are those obtained by polycondensing polymerizable ω-amino acids or their lactams having a 3- or more membered ring, or dibasic acids and diamines. Examples of the ω-amino acids usable the polycondensation include ε-aminocaproic acid, 7-aminoheptanic acid, 9-aminononanoic acid, 11-aminoundecanoic acid and 12-aminodecanoic acid. Examples of the lactams include ε-caprolactam, enantholactam, capryllactam, lauryllactam, α-pyrrolidone and α-piperydone.

The dibasic acids usable for the said polycondensation include adipic acid, glutaric acid, pimelic acid, suberic acid, azelaic acid, sebacic acid, dimer acid, undecanedionic acid, dodecanedionic acid, hexadecanedionic acid, hexadecenedionic acid, eicosanedionic acid, eicosanedienedionic acid, diglycolic acid, 2,2,4-trimethyladipic acid, xylylenedicarboxylic acid, 1,4-cyclohexadicarboxylic acid, terephthalic acid and isophthalic acid. The diamines include hexamethylenediamine, tetramethyldiamine, nonamethylenediamine, undecamethylenediamine, dodecamethylenediamine, 2,2,4 (or 2,4,4)-trimethylhexamethylenediamine, bis-(4,4'-aminocyclohexyl)methane, and methaxylylenediamine.

Examples of the polyamide resins usable in the present invention include polyamide 6, polyamide 66, polyamide 6/66 copolymer, and mixtures thereof. Polyamide 6 or a mixture of polyamide 6 and polyamide 6/66 copolymer is preferably used. The percentage of polyamide 66 in the polyamide 6/66 copolymer is preferably in the range of 2 to 25% by weight. A higher percentage of polyamide 66 tends to lower weld strength. As for the mixing percentages of polyamide 6 and polyamide 6/66 copolymer in their mixture, the percentage of polyamide 6 is preferably 100 to 20% by weight and the percentage of polyamide 6/66 copolymer is preferably 0 to 80% by weight. A higher percentage of polyamide 6/66 copolymer tends to reduce heat resistance of the composition.

Relative viscosity of the polyamide resin used in the present invention, as measured in 98% sulfuric acid at a concentration of 1% and 25° C. according to JIS K6810, is preferably 2.0 to 4.0. In case of a lower viscosity of polyamide resins, the molded article may become fragile, while in case of a higher viscosity fluidity of the composition may be deteriorated. The more preferred range of relative viscosity of the polyamide resin is 2.2 to 3.7. In case where a plural number of polyamide resins are used, it is preferable that the relative viscosity of their mixture falls within the above-defined range.

As nigrosine or nigrosine derivative in the molding material of the present invention, there can be used, for example, the black dyes obtained by heating and condensing a mixture of nitrobenzene, aniline and aniline hydrochloride in the presence of iron or copper. They include those which were made basic by alkalinization or water-soluble by sulfonation. Nigrosine and nigrosine derivatives are the mixtures of azine compounds such as triphenazine oxide and phenazinazine though the product differs depending on the reaction conditions, relative ratio of the reaction product and other factors.

Examples of the commercially available nigrosine and nigrosine derivatives include NIGROSINE BASE EXBP, NUBIAN COMPLEX BLACK G-02, NUBIAN BLACK PA-0800, NUBIAN BLACK PA-0801, NUBIAN BLACK EP-3, NIGROSINE BASE EE, NIGROSINE BASE EX, SPECIAL BLACK EB, NIGROSINE BASE SA, NIGROSINE BASE SAP and NIGROSINE BASE NB (all being available from Orient Chemical Industries Co. Ltd.). The amount of nigrosine or nigrosine derivative used in the molding material is 0.05 to 10 parts by weight based on 100 parts by weight of the polyamide resin. A smaller amount of nigrosine or nigrosine derivative tends to lower weld strength. The preferred amount range of nigrosine or nigrosine derivative is 0.1 to 5 parts by weight based on 100 parts by weight of the polyamide resin.

It is more preferable that glass fiber is blended in the polyamide resin composition of the present invention. It is possible to use glass fiber commonly used in the thermoplastic resin products, preferably chopped strand made of E glass (non-alkali glass). The fiber diameter is preferably 1 to 20 $\mu$m, more preferably 5 to 15 $\mu$m. It is preferable that glass fiber used in the present invention is surface-treated with a substance such as silane coupling agent for improving bond strength to the polyamide resin. The amount of glass fiber blended is not more than 100 parts by weight based on 100 parts by weight of the polyamide resin. A higher content of glass fiber tends to be detrimental to surface smoothness of the molded article. The more preferred range of glass fiber content is 20 to 80 parts by weight based on 100 parts by weight of the polyamide resin.

In the resin composition of the present invention, it is possible to blend inorganic fillers other than glass fiber, such as glass flakes, glass beads, mica, talc, kaolin, wollastonite, potassium titanate whisker, etc., and other known additives, e.g. heat stabilizer such as copper compounds, release agent, colorant such as carbon black, etc., within limits not affecting the effect of the present invention. It is also preferable to blend iodized alkali metal salts or iodized alkali earth metal salts such as potassium iodide for improving weld strength. Blending of these materials may be conducted at any stage in the process from polymerization of resin to molding, preferably conducted by melt kneading by an extruder.

The integrally molded articles of polyamide resins according to the present invention can be produced from, for example, a process which comprises molding a polyamide resin composition as primary molding material to obtain at least one primary molded pieces, injection molding a polyamide resin composition as second molding material on the surface of the primary molded piece, and welding the primary molded piece and the molded piece portion comprising the secondary molding material. The integrally molded article produced by the above method is constituted by at least one, usually plurally devided primary molded pieces; a secondary molding material; and a welded part. Usually, the welded part comprises a part of primary molded piece and the secondary molding material, in which the primary molded piece and the secondary molding material are integrated by means of a boundary. Namely, the primary molded pieces and the secondary molding material are overlapped at the boundary in the welded part. The welded part is clearly distinguished visually as the boundary between the primary molded pieces and the secondary molding material. On the other hand, in a welded part by the another method such as vibration welding, spin welding, heat plate welding and ultrasonic welding, such overlapped part and boundary formed by the injection molding according to the present invention are not present.

In case where the article to be produced is a hollow molded piece, first the two segments of the hollow molded piece to be produced are molded by injection molding as primary molded pieces and then the segments are set in the mold cavity for secondary molding, after which the secondary molding material is injection molded, and the said segments and secondary molding material are welded.

For obtaining a hollow molded article by using a polyamide resin composition in the present invention, a method may be used in which separate molds are used for primary molding and secondary molding, and the primary molded piece is transferred into the mold for secondary molding. It is also possible to use a process in which, as for instance described in Japanese Patent Application Laid-Open (KOKAI) No. 62-87315, a slide mechanism is provided in the mold, and after primary molding and mold opening, one of the two segments of the primary molded piece is transferred into the mold and butted to the other segment, followed by secondary molding. In case of using the mold having a slide mechanism, if the latter method, however, in case where the primary and secondary molding materials are different, it is necessary to use a molding machine having two cylinders.

The integrally molded article produced by the above method is constituted by at least one, usually plurally devided primary molded pieces; a secondary molding material; and a welded part. Usually, the welded part comprises a part of primary molded piece and the secondary molding material, in which the primary molded piece and the secondary molding material are integrated by means of a boundary. Namely, the primary molded pieces and the secondary molding material are overlapped at the boundary in the welded part. The welded part is clearly distinguished visually as the boundary between the primary molded pieces and the secondary molding material. On the other hand, in a welded part by the another method such as vibration welding, spin welding, heat plate welding and ultrasonic welding, such overlapped part and boundary by the injection molding according to the present invention is not present.

The integrally molded articles of polyamide resins according to the present invention are excellent in mechanical strength, heat resistance, chemical resistance, etc., and also high in weld strength. Even in case where the integrally molded articles of the present invention are the hollow molded articles, they have excellent weld strength and are preferred for use as automobile parts such as intake manifold, intake resonator, reservoir tank, etc.

EXAMPLES

The present invention is described in further detail by showing examples below, but it is to be understood that these examples are merely intended to be illustrative and not to be construed as limiting the scope of the invention.

The materials used in the following examples are listed below.
(1) Polyamide 6: produced by Mitsubishi Engineering-Plastics Corporation; relative viscosity: 2.8
(2) Polyamide 6/66 copolymer: produced by Mitsubishi Engineering-Plastics Corporation; polyamide 6: 85 wt %, polyamide 66: 15 wt %; relative viscosity: 2.8
(3) Glass fiber: ECS03T249GH produced by Nippon Electric Glass Co., Ltd.
(4) Nigrosine or nigrosine derivative 1: NUBIAN BLACK EP-3 Nippon Electric Glass Co., Ltd.; fiber diameter: 10 μm
(5) Nigrosine or nigrosine derivative 2: NUBIAN BLACK PA-0801 produced by Orient Chemical Industries Co., Ltd.
(6) Carbon Black: Carbon Black H-950 produced by Mitsubishi Chemical Corporation.
(7) Relative viscosity of polyamide: Determined in 98% sulfuric acid at a concentration of 1% and 25° C. according to JIS K6810
(8) Weld strength: The integrally molded article (specimen B in FIGS. 1 and 2) was pulled under the conditions of pulling rate=5 mm/min; chuck interval=115 mm, and the load at break was measured. It was expressed in kgf and represented as weld strength.

Figure 2:
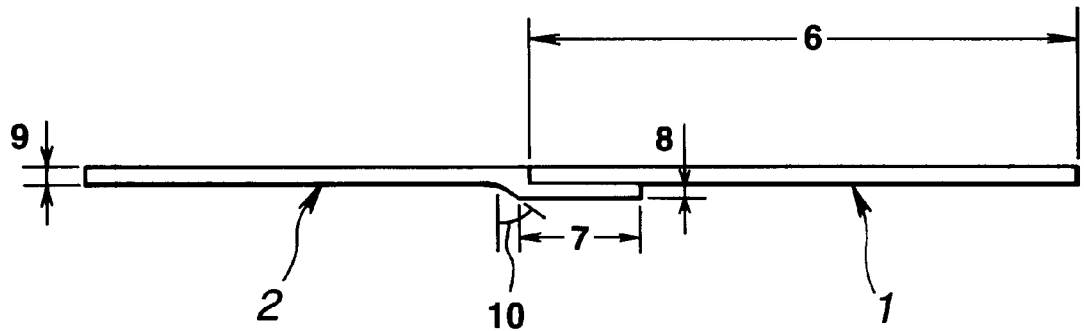
FIG. 2 is a side view of the specimen B.

In FIGS. 1 and 2, reference numeral 1 indicates the portion of the specimen A in the specimen B, and reference numeral 2 indicates the portion of the molded piece made of the secondary molding material in the specimen B. The lengths and angle of the sections indicated by the reference numerals are set forth below:

3: 218 mm, 4: 12.82 mm, 5: 25 mm, 6: 121.5 mm, 7: 28 mm, 8: 3.0 mm, 9: 3.0 mm, 10: 45°

Examples 1–3

Polyamide 6 resin, polyamide 6/66 compolymer, glass fiber and nigrosine or a nitrosine derivative were blended in the percentages shown in Table 1 and melt kneaded by a double-screw extruder to obtain a polyamide resin composition. Using this polyamide resin composition (primary molding material), a specimen A (primary molded piece) was molded by an injection molding machine (AUTOSHOT 50B mfd. by FANUK LTD) under the conditions shown in Table 2, left in a hot air oven (120° C.) for 30 minutes, then taken out and immediately placed in a mold for secondary molding. Then a specimen B was injection molded using the said polyamide resin composition (as second molding material), and the specimen A and the molded piece portion comprising the secondary molding material were welded in the mold to obtain an injection-welded integrally molded article. Injection weld strength of this molded article was measured.

Comparative Example 1

Polyamide 6 resin, polyamide 6/66 copolymer and glass fiber were blended in the percentages shown in Table 1 and melt kneaded by a double-screw extruder to obtain a polyamide resin composition. Using this polyamide resin composition, an injection-welded integrally molded article was obtained according to the same procedure as Example 1, and its injection weld strength was determined in the same way as in Example 1.

Comparative Example 2

Polyamide 6 resin and glass fiber were blended in the percentages shown in Table 1 and melt kneaded by a double-screw extruder to obtain a polyamide resin composition. Using this polyamide resin composition, an injection-welded integrally molded article was obtained according to the same procedure as Example 1 and its injection weld strength was determined in the same way as in Example 1.

Comparative Example 3

Polyamide 6 resin, polyamide 6/66 copolymer, glass fiber and nigrosine or a nigrosine derivative were blended in the percentages shown in Table 1 and melt kneaded by a double-screw extruder to obtain a polyamide resin composition. Using this polyamide resin composition, an injection-welded integrally molded article was obtained according to the same procedure as Example and its injection weld strength was determined in the same way as in Example 1.

TABLE 1

|  | Example 1 | Examle 2 | Example 3 |
|---|---|---|---|
| Polyamide 6 resin (parts by weight) | 68.3 | 68.3 | 100 |
| Polyamide 6/66 copolymer (parts by weight) | 31.7 | 31.7 | — |
| Glass fiber T249GH (parts by weight) | 53.8 | 53.8 | 53.8 |
| NUBIAN BLACK EP-3 (parts by weight) | 0.31 | — | 0.62 |
| NUBIAN BLACK PA-0801 (parts by weight) | — | 0.15 | — |
| Carbon black H-950 (parts by weight) | — | — | — |
| Weld strength (kgf) | 237 | 231 | 221 |

|  | Comparative Example 1 | Comparative Example 2 | Comparative Example 3 |
|---|---|---|---|
| Polyamide 6 resin (parts by weight) | 68.3 | 100 | 68.3 |
| Polyamide 6/66 copolymer (parts by weight) | 31.7 | — | 31.7 |
| Glass fiber T249GH (parts by weight) | 53.8 | 53.8 | 53.8 |
| NUBIAN BLACK EP-3 (parts by weight) | — | — | 0.04 |
| NUBIAN BLACK PA-0801 (parts by weight) | — | — | — |
| Carbon black H-950 (parts by weight) | — | — | 0.12 |
| Weld strength (kgf) | 204 | 178 | 206 |

TABLE 2

|  | Primary molding | Secondary molding |
|---|---|---|
| Cylinder temperature (° C.) | 280 | 280 |
| Mold temperature (° C.) | 80 | 80 |
| Injection rate (mm/sec) | 100 | 100 |
| Injection pressure dwell time (sec) | 6 | 11 |
| Cooling time (sec) | 15 | 15 |

What is claimed is:

1. An integrally molded article of polyamide resin comprising at least one primary molded pieces made of a primary molding material and at least one secondary molded pieces made of a secondary molding material, and having a welded part, said secondary molding material being injection molded on the surface of said primary molded piece, thereby welding the secondary molded piece comprising the secondary molding material to said primary molded piece, and said primary and secondary molding materials each comprising 100 parts by weight of a polyamide resin and 0.05 to 10 parts by weight of nigrosine or a nigrosine derivative.

2. An integrally molded article according to claim 1, wherein the polyamide resin is polyamide 6, polyamide 6/66 copolymer, or a mixture of polyamide 6 and polyamide 6/66 copolymer.

3. An integrally molded article according to claim 1, wherein relative viscosity of the polyamide resin, measured in 98% sulfuric acid at a concentration of 1% and 25° C., is 2.0 to 4.0.

4. An integrally molded article according to claim 1, wherein the primary molded pieces and the secondary molding material are overlapped at the boundary thereof.

5. An integrally molded article according to claim 1, wherein glass fiber is further blended in said primary and secondary molding materials in an amount of not more than 100 parts by weight based on 100 parts by weight of the polyamide resin.

6. An integrally molded article according to claim 5, wherein the amount of glass fiber blended is 10 to 100 parts by weight based on 100 parts by weight of the polyamide resin.

7. An integrally molded article according to claim 5, wherein the polyamide resin is polyamide 6, polyamide 6/66 copolymer, or a mixture of polyamide 6 and polyamide 6/66 copolymer.

8. An integrally molded article according to claim 5, wherein relative viscosity of the polyamide resin, as measured in 98% sulfuric acid at a concentration of 1% and 25° C., is 2.0 to 4.0.

9. An integrally molded article according to claim 5, wherein the primary molded pieces and the secondary molding material are overlapped at the boundary thereof.

10. A process for producing the integrally molded article according to claim 1, comprising:

producing at least one primary molded pieces by molding a primary molding material, having the primary molded pieces in the mold cavity for secondary molding, injection molding the polyamide resin composition as second molding material on the surface of the primary molded piece, and welding the primary molded piece and the molded piece portion comprising the secondary molding material.

11. A process for producing the integrally molded article according to claim 5, comprising:

producing at least one primary molded pieces by molding a primary molding material, having the primary molded pieces in the mold cavity for secondary molding, injection molding the polyamide resin composition as second molding material on the surface of the primary molded piece, and welding the primary molded piece and the molded piece portion comprising the secondary molding material.

* * * * *